US010564948B2

(12) United States Patent
Liu et al.

(10) Patent No.: US 10,564,948 B2
(45) Date of Patent: Feb. 18, 2020

(54) METHOD AND DEVICE FOR PROCESSING AN IRREGULAR APPLICATION

(71) Applicant: Wuxi Research Institute of Applied Technologies Tsinghua University, Wuxi, Jiangsu (CN)

(72) Inventors: Leibo Liu, Jiangsu (CN); Zhaoshi Li, Jiangsu (CN); Shaojun Wei, Jiangsu (CN)

(73) Assignee: Wuxi Research Institute of Applied Technologies Tsinghua University, Wuxi, Jiangsu (CN)

( * ) Notice: Subject to any disclaimer, the term of this patent is extended or adjusted under 35 U.S.C. 154(b) by 0 days.

(21) Appl. No.: 15/992,067

(22) Filed: May 29, 2018

(65) Prior Publication Data
US 2018/0349118 A1 Dec. 6, 2018

(30) Foreign Application Priority Data

May 31, 2017 (CN) .......................... 2017 1 0398325

(51) Int. Cl.
*G06F 9/44* (2018.01)
*G06F 8/41* (2018.01)
(Continued)

(52) U.S. Cl.
CPC ................ *G06F 8/445* (2013.01); *G06F 8/33* (2013.01); *G06F 8/41* (2013.01); *G06F 9/4881* (2013.01); *G06F 8/34* (2013.01); *G06F 8/433* (2013.01)

(58) Field of Classification Search
CPC ..... G06F 8/33; G06F 8/34; G06F 8/41; G06F 8/433; G06F 8/445; G06F 9/4481; G06F 8/4452; G06F 8/4881
See application file for complete search history.

(56) References Cited

U.S. PATENT DOCUMENTS 9,043,774 B2 * 5/2015 Bently .................... G06F 8/433
717/155
2009/0293048 A1 * 11/2009 Chen ....................... G06F 8/433
717/151
(Continued)

FOREIGN PATENT DOCUMENTS

CN 101840329 A 9/2010

OTHER PUBLICATIONS

Silvia Lovergine, YAPPA: a Compiler-Based Parallelization Framework for Irregular Applications on MPSoCs, 2013, pp. 123-129. https://ieeexplore.ieee.org/stamp/stamp.jsp?tp=&arnumber=6683968 (Year: 2013).*

(Continued)

*Primary Examiner* — Mongbao Nguyen
(74) *Attorney, Agent, or Firm* — Fish & Richardson P.C.

(57) ABSTRACT

A method and a device for processing an irregular application are disclosed. The method comprises: determining M classes of tasks of the irregular application; executing the M classes of tasks in parallel, wherein each task has an index respectively; for the i-th task in the x-th class of task of the M classes of tasks: when the i-th task is executed to a rendezvous, stalling the i-th task, and determining a rule corresponding to the i-th task; inspecting current state of the i-th task according to the rule corresponding to the i-th task so as to steer the continued execution of the i-th task. According to the embodiment of the present disclosure, irregular applications can be correctly and automatically executed with high performance in a manner of fine-grained pipeline parallelism.

15 Claims, 4 Drawing Sheets

(51) Int. Cl.
  *G06F 9/48* (2006.01)
  *G06F 8/33* (2018.01)
  *G06F 8/34* (2018.01)

(56) References Cited

U.S. PATENT DOCUMENTS

| | | | | |
|---|---|---|---|---|
| 2012/0079494 | A1* | 3/2012 | Sandstrom | G06F 9/4881 718/104 |
| 2012/0210323 | A1* | 8/2012 | Hosouchi | G06F 9/485 718/102 |
| 2012/0304194 | A1* | 11/2012 | Engh-Halstevdt | G06F 9/4881 718/106 |
| 2014/0047452 | A1* | 2/2014 | Ceze | G06F 9/5027 718/104 |
| 2014/0109102 | A1* | 4/2014 | Duncan | G06F 9/3851 718/103 |
| 2015/0268992 | A1* | 9/2015 | Fan | G06F 9/4881 718/106 |
| 2016/0321104 | A1* | 11/2016 | Fang | G06F 9/5083 |
| 2017/0094013 | A1* | 3/2017 | Chong | G06F 3/0619 |
| 2017/0262320 | A1* | 9/2017 | Newburn | G06F 9/52 |
| 2017/0262321 | A1* | 9/2017 | Newburn | G06F 9/54 |
| 2018/0143852 | A1* | 5/2018 | Ballantyne | G06F 9/5027 |
| 2018/0189110 | A1* | 7/2018 | Venkatesh | G06F 15/8092 |
| 2018/0189234 | A1* | 7/2018 | Nurvitadhi | G06F 15/8069 |
| 2018/0189239 | A1* | 7/2018 | Nurvitadhi | G06F 9/3001 |

OTHER PUBLICATIONS

Sean Jeffrey Treichler, REALM: Performance Portability Through Composable Asynchrony, 2016, pp. 4-149. .https://legion.stanford.edu/pdfs/treichler_thesis.pdf (Year: 2016).*
Sanjay Chatterjee, Dynamic Task Parallelism with a GPU Work-Stealing Runtime System, 2011, pp. 1-15. http://www.owlnet.rice.edu/~jmg3/wstgpu.pdf (Year: 2011).*
Matthias Korch, A Comparison of Task Pools for Dynamic Load Balancing of Irregular Algorithms, 2004, pp. 1-26. https://ai2neu.inf.uni-bayreuth.de/pub/bib/paper/tp-conc04.pdf (Year: 2004).*
Roberto Ribeiro, A Framework for Efficient Execution of Data Parallel Irregular Applications on Heterogeneous, 2014, pp. 1-30. https://pdfs.semanticscholar.org/8bcf/9ae49638a2a63e54c0cc95e05078c657279e.pdf (Year: 2014).*
Chinese Application No. 201710398325.3, First Office Action dated Aug. 13, 2018, 11 pages.
Chinese Application No. 201710398325.3, Notice on Granting the Patent Right for Invention, with translation, dated Jan. 15, 2019, 3 pages.
Chinese Application No. 201710398325.3, Second Office Action, with translation, dated Oct. 22, 2018, 13 pages.

* cited by examiner 101 determining M classes of tasks of the irregular application 102 executing the M classes of tasks in parallel; for an i-th task in the x-th class task of the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting a current state of the i-th task according to the rule corresponding to the i-th task so as to steer the continued execution of the i-th task

Figure 1

```
class Update: public Task {...};
class Visit: public Task {...};
class Writeback: public Task
    {...};
Queue<Update> qu;
Queue<Visit> qv;
Queue<Writeback> qw;
for-each(Update tu : qu){
    ... // Task body for tu
  for-each(Visit tv : qv){
      ...
    qu.push(...);
    qv.push(...);
    qw.push(...);
      // Task body for tv
  }
  for-all(Writeback tw : qw){
          ... // Task body for tw
  }
}
```

Figure 2

METHOD AND DEVICE FOR PROCESSING AN IRREGULAR APPLICATION

CROSS-REFERENCE TO RELATED APPLICATION(S)

This application claims priority to a Chinese Patent Application No. 201710398325.3, filed with the Chinese Patent Office on May 31, 2017 and entitled "Method and Device for Processing an Irregular Application", which is incorporated herein by reference entirely.

TECHNICAL FIELD

The present disclosure relates to the field of computer technology, and more particularly, to a method and a device for processing an irregular application.

BACKGROUND

This section is intended to provide a background or context to the embodiments of the present disclosure set forth in the claims. The description herein is not admitted to be prior art by inclusion in this section.

In order to improve the efficiency of application execution, there are more and more researches on parallelization technology. In the existing High-Level Synthesis (HLS) based on C language, OpenCL or the like, in order to achieve parallelization processing, it is necessary to extract parallelism of an application during compile time. However, such a technique is only suitable for executing regular applications, and has extremely poor performance in implementing irregular applications (e.g., graphic analysis and sparse matrix calculations, etc.).

This is because the irregular applications usually have poor locality or statically unpredictable control flows. The dependencies between tasks in such applications can only be completely determined after the input data is given during operations, thus, the existing High-level synthesis solutions are over-serialized when implementing irregular applications and the execution efficiency is very low.

Therefore, at present, to achieve parallelization of irregular applications, it is only possible to manually orchestrate the inherent parallelism of irregular applications, but the complexity of implementation is very large. Then, how to efficiently implement irregular applications becomes an urgent problem to be solved.

SUMMARY

In order to execute irregular applications with high performance, embodiments of the present disclosure provide the following solutions.

In an embodiment of the present disclosure, a method for processing an irregular application is provided. The method includes: determining M classes of tasks of the irregular application, wherein M is a positive integer; executing the M classes of tasks in parallel, wherein each task in each class of tasks in the M classes of tasks has an index respectively, and the index of each task is used to indicate an order in which the task appears in the irregular application; for an i-th task in the x-th class of task in the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting a current state of the i-th task according to the rule corresponding to the i-th task so as to steer the continued execution of the i-th task.

In an embodiment of the present disclosure, a device for processing an irregular application is also provided. The device includes a processor, wherein the processor is configured to execute following program modules stored in a memory: a task determining module configured to determine M classes of tasks of the irregular application, wherein M is a positive integer; a task executing module configured to execute the M classes of tasks in parallel, wherein each task in each class of tasks in the M classes of tasks has an index respectively, and the index of each task is used to indicate the order in which the task appears in the irregular application; the task executing module is further configured to: for an i-th task in the x-th class task of the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting a current state of the i-th task according to the rule corresponding to the i-th task so as to steer a continued execution of the i-th task.

In an embodiment of the present disclosure, a device for processing an irregular application is also provided. The device comprises a processing system, a memory and a computer program stored on the memory and operable on the processing system, the processing system being coupled with the memory, and the method described above for processing an irregular application is implemented when the processing system executes the computer program.

In the embodiment of the present disclosure, a computer-readable storage medium is also provided. The computer-readable storage medium stores a computer program capable of executing the above method for processing an irregular application.

In the embodiment of the present disclosure, by dividing M classes of tasks of the irregular application and causing the M-class tasks to be executed in parallel, the execution performance and efficiency of the irregular application can be improved; and when a task is executed to a rendezvous, the current state of the task is inspected according to its dependencies on other tasks, and the continued execution of the task is steered on the basis of the current state, thereby ensuring the correctness of the task parallel execution result. Therefore, according to the embodiment of the present disclosure, irregular applications can be efficiently and correctly executed in a manner of fine-grained pipeline parallelism.

BRIEF DESCRIPTION OF THE DRAWINGS

In order to more clearly illustrate technical solutions in embodiments of the present disclosure or in the prior art, the attached drawings, which are to be used in the following descriptions of the embodiments or the prior art, will be briefly described below. It is apparent that the attached drawings in the following descriptions are merely examples of the present disclosure, and other drawings may be obtained by those skilled in the art based on these drawings without creative efforts. In the drawings:

FIG. 1 is a flowchart of a method for processing an irregular application according to an embodiment of the present disclosure;

FIG. 2 is a diagram that shows an example code segment of an irregular application according to an embodiment of the present disclosure;

DETAILED DESCRIPTION

Figure 3:
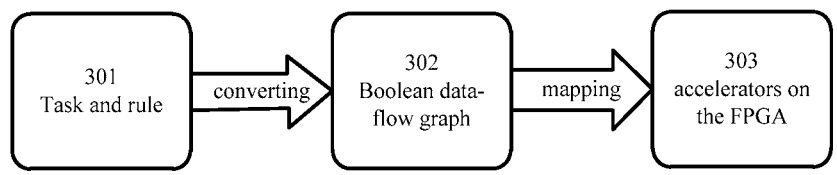
FIG. 3 is a schematic diagram of a process for implementing an irregular application on an FPGA according to an embodiment of the present disclosure.

To make the objectives, technical solutions, and advantages of the embodiments of the present disclosure clearer, the embodiments of the present disclosure will be further described in detail below in conjunction with the accompanying drawings. Herein, the exemplary embodiments of the present disclosure and the description thereof are used to explain the present disclosure, but are not intended to limit the present disclosure.

As described above, since the dependencies between tasks in irregular applications can only be completely determined after the input data is given at runtime, the high-level synthesis based on C language or OpenCL and the like are often over-serialized when implementing irregular applications, thus the execution efficiency is very low.

An embodiment of the present disclosure provides a solution for processing an irregular application, which can effectively solve the above problems. The solution of the embodiment of the present disclosure will be described in detail below in conjunction with various embodiments.

FIG. 1 is a flowchart of a method for processing an irregular application according to an embodiment of the present disclosure. As shown in FIG. 1, the method may include: Step 101: determining M classes of tasks of the irregular application, wherein M is a positive integer; Step 102: executing the M classes of tasks in parallel, wherein each task in each class of tasks in the M classes of tasks has an index respectively, and the index of each task is used to indicate an order in which the task appears in the irregular application; for an i-th task in the x-th class task of the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting a current state of the i-th task according to the rule corresponding to the i-th task so as to steer the continued execution of the i-th task.

It can be seen that in the embodiment of the present disclosure, by dividing M classes of tasks of the irregular application and causing the M-class tasks to be executed in parallel, the execution performance and efficiency of the irregular application can be improved; and when a task is executed to a rendezvous, the current state of the task is inspected according to its dependencies on other tasks, and the continued execution of the task is steered on the basis of the current state, thereby ensuring the correctness of the task parallel execution result. Therefore, according to the embodiment of the present disclosure, irregular applications can be correctly and automatically executed with high performance in a manner of fine-grained pipeline parallelism.

Specifically, in the embodiment of the present disclosure, since irregular applications may be abstracted as tasks that can be executed in parallel, and dependencies between tasks may be abstracted as rules, it is possible to make aggressive assumptions that the dependencies between tasks do not exist at compile time, ensuring that the tasks are executed in parallel to improve computational performance; then the states of the tasks are inspected according to the rules at rendezvous at runtime to ensure the correctness of the parallel results. Therefore, with the embodiments of the present disclosure, it is possible to implement parallelization processing of irregular applications with a high-level model, which greatly reduces the implementation complexity compared to the existing approach of manually orchestrating the parallelism.

In the embodiment of the present disclosure, there may be multiple ways to determine the M classes of tasks of the irregular application, which are not limited in the present disclosure. The related changes should all fall within the scope of the present disclosure. For example, considering that an irregular application is typically built around loop constructs, M loops in an irregular application may be identified as M classes of tasks. It can be understood that the M loops may be parallel or nested.

For example, depending on the compiler's classification method, loop constructs may be divided into for-all and for-each loops. As is known in the art, for the for-all loop, all iterations can be executed in parallel. For the for-each loop, subsequent iterations may need to get the correct value from previous ones. Therefore, the above mentioned M classes of tasks may include for-each tasks and for-all tasks. In addition, each class of tasks may include at least one task, and each task may be one iteration of a loop corresponding to the task of that class. That is, each of the iterations in the loop may be abstracted as a task. Then, it can be understood that new tasks may be dynamically created during the execution of one class of task, that is, during the execution of a loop.

For ease of description, herein, t indicates a task, $\Sigma$ indicates the domain of program states (i.e. memory locations and the values stored at the locations), and T indicates the domain of tasks.

Task t may be a partial function from states to states and tasks, t: $\Sigma \rightarrow \Sigma \times T$. Tasks with the same function (i.e. loop body) may be divided into a task set. Then, based on the loop construct used in a task set, the task set may be categorized as either a for-all task set or a for-each task set. A task domain T is the conjunction of all task sets. That is, here, the task domain T is the cross product or Cartesian product of all task sets. In addition, tasks may also be categorized as active tasks and inactive tasks. For example, if a task is ready to be executed, it is considered to be active. Similarly, all of the active tasks with the same function may form an active task set. The active task set may be a subset of the task set. In addition, for each class of task (i.e. each loop), each task may be indexed with a non-negative integer to indicate its order in the activating sequence. For example, in a for-each task set, task $t_j$ (j is a non-negative integer) may indicate the j-th activated task; whereas in a for-all task set, since the sequence of task activation doesn't influence execution order, all tasks may be labeled with 0 or other numbers, so that these tasks may have the same order.

In an embodiment, an index may be allocated for each task in each of the M classes of tasks, where the index of each task may be used to indicate an order in which the task appears in the irregular application. It can be understood that, since during the execution of each class of tasks (for example, during the execution of one loop) each task of this class may be dynamically created, the indexes of the respective tasks may also be dynamically allocated during the execution.

In an embodiment, the index of each task may have the form of an M-tuple. For example, in the M-tuple used to indicate the i-th task in the x-th class task, the x-th element is used to indicate the iteration count of the i-th task in the x-th class task, the (x−1) elements before the x-th element are used to indicate the (x−1) classes of tasks executed before the x-th class task in the M classes of tasks respectively, and the order of the (x−1) elements may correspond to the order in which the (x−1) classes of tasks appear in an irregular application. It can be understood that in the case of dividing M loops in an irregular application into M classes of tasks, the order in which M classes of tasks appear in the irregular application is the order in which M loops appear in the irregular application.

In addition, each element in the foregoing M-tuple may be a non-negative integer or a positive integer or other suitable representation, which is not limited in the embodiments of the present disclosure.

It can be seen that a well-order on each task can be maintained with such an indexing method, so that the correctness of subsequent parallel execution results can be ensured according to the index. In other words, with such an index method, it can be ensured that the results of the parallel execution of the respective tasks are equivalent to the results of the sequential executions.

It will be understood that the sequential execution described herein may be defined as follows: given an initial active task $t_0$, choosing the minimum task $t_{min}$ in all of the active tasks and applying $t_{min}$ to $\Sigma$ iteratively until there is no more active task. The minimum task described here may refer to the task with the minimal index among all active tasks.

It will also be understood that it may be determined whether an index is minimal by comparing the indexes. For example, in the case of using the M-tuple to indicate the index as described above, the elements of the M-tuple corresponding to each task may be compared from left to right. The previous elements in an M-tuple may have higher weight than the subsequent elements. For example, each element of a first task's M-tuple may be compared with the corresponding element of a second task's M-tuple. If the first element of the first task's M-tuple is smaller than the first element of the second task, then the index of the first task is considered to be smaller than that of the second task. If the first element of the first task's M-tuple is equal to the first element of the second task, then continue to compare the second element of the first task's M-tuple with the second element of the second task's M-tuple. If the second element of the first task's M-tuple is smaller than the second element of the second task's M-tuple, then the index of the first task is considered to be smaller than that of the second task. And so on.

It should be understood that the "first" and "second" mentioned in the first task and the second task here are only for distinguishing between tasks, and do not indicate the order in which the two tasks appear in the irregular application.

For those skilled in the art to better understand the index manner described in the embodiments of the present disclosure, the following description will be given by way of example. It should be understood that this example does not impose any limitation on the scope of the embodiments of the present disclosure. FIG. 2 shows an example code segment of an irregular application. In the example of FIG. 2, there are three loops. In particular, a Visit loop with for-each loop configuration and a Writeback loop with for-all loop configuration are nested in the outer Update loop with for-each loop configuration. In this example, the Update loop, Visit loop, and Writeback loop may be indicated as three classes of tasks: tu, tv, and tw, respectively. Visit's task body activates (i.e. pushes in queues) 3 classes of tasks. Tu, tv, and tw may be numbered using iu, iv, and iw, respectively, which are used to indicate the order in which tu, tv, and tw appear in the irregular application. In this example, iu, iv, and iw may be non-negative integers. As shown in FIG. 2, tu, tv, and tw may be indexed using triples, respectively. In this example, tu={cu++, 0, 0}, tv={iu, cv++, 0}, tw={iu, iv, 0}. Among others, cu++ indicates the iteration count in the Update loop corresponding to tu, and cv++ may indicate the iteration count in the Visit loop corresponding to tv.

It can be seen that through such an indexing method, the order of occurrence of tasks in the irregular application can be effectively indicated, thereby providing a basis for ensuring the correctness of the task parallel execution results.

As mentioned above, one of the characteristics of irregular applications is dependencies that cannot be resolved at compile-time, as a result, if multiple tasks in an irregular application are to be executed simply in parallel, conflicts among them may introduce errors in the program state, leading to irregular application execution errors. In order to achieve parallelization of irregular applications, embodiments of the present disclosure may use indexes to indicate the order of occurrence of tasks in an irregular application, that is, an irregular application is abstracted as a well-ordered task sets. And for the dependencies between tasks, they may be expressed as rules. When a task is executed to a rendezvous, such a rule is used to inspect whether the task violates the dependency, and then the continued execution of the task is steered according to the inspection result, so that the correctness of the parallel execution result can be ensured.

In the embodiment of the present disclosure, an aggressive parallelization idea is adopted. In particular, depending on whether conflicted tasks are allowed to be executed simultaneously, the aggressive parallelization techniques may be grouped into two categories as follows.

(1) Speculative parallelization: multiple tasks are executed regardless of their conflicts. Each task may inspect its collisions with other tasks at runtime. If there is a conflict with a previous task, the task should be aborted.

(2) Coordinative parallelization: it is ensured that only non-conflict tasks are activated.

Whether the above-mentioned speculative parallel technology or coordinated parallel technology is used to execute the M classes of tasks of irregular applications in parallel, the current state of the M classes of tasks may be inspected using the rules defined in the embodiment of the present disclosure when the task is executed to the rendezvous, thereby correctly steering the continued execution of the task.

In the embodiment of the present disclosure, a rendezvous may be predefined. For example, an instruction for specifying a rendezvous or the like may be embedded in an irregular application by a programmer in advance.

In embodiments of the present disclosure, a rule may be defined as follows: a rule is a promise to return a value to its creator in the future, when its creator reaches a planned rendezvous. The returned value is a function of all states of the runtime system spanning from the creation of the rule to the return point.

Specifically, for the i-th task described above, when the i-th task is executed to a rendezvous, the i-th task may be stalled, and the rule corresponding to the i-th task may be determined according to the index of the i-th task. In an embodiment, a pre-defined general rule may be instantiated based on at least the index of the i-th task to create the rule corresponding to the i-th task, where the general rule may be used to indicate the dependency relationship between the tasks of the irregular application.

For example, an index of the i-th task (for example, the above M-tuple) and other related parameters may be provided as input to the general rule, thereby instantiating the general rule and creating the rule corresponding to the i-th task. As can be seen, each instantiated rule may be created at runtime and may correspond to a parent task.

In an embodiment, the general rule may be predefined, for example, the general rule may be written by a programmer in advance. The general rule may be invoked when the hardware executes an irregular application.

In an embodiment, the general rule may include a normal paths and an exit path.

For example, a normal path may be defined using an Event-Condition-Action (ECA) grammar. An ECA grammar may use traditional ECA clause (ON event IF conditions DO actions). For example, the specific semantics of a rule can be as follows: a rule is triggered by an event; then it examines the conditions and fires an action if the condition is met. It can be seen that through the ECA grammar, the dependency relationship between tasks can be indicated simply and effectively, thereby simplifying the parallelization of irregular applications.

In addition, in alternative embodiments, the above events may include activation of tasks, or tasks reaching specific operations in task bodies, or combinations of these two classes of events. By signaling an event, index and data fields of the triggering task are broadcast to all rules. The above conditions may be boolean expressions composed of index and data fields in triggering events, and parameters forwarded by parent tasks when creating this rule. The above actions may include returning a boolean value to steer task tokens in the task body of the parent task. It should be understood that the description of the events, conditions, and actions herein is merely exemplary and is not limited by the embodiments of the present disclosure. Those skilled in the art may define specific contents of events, conditions and actions according to specific implementation conditions.

As can be seen from the above mentioned contents, when the task reaches the rendezvous, it will stall and wait for the return value of the corresponding rule. However, if a value does not return on the normal path of the rule, the task will always wait at the rendezvous, which may cause deadlock, especially if the execution resources are limited. Therefore, in an embodiment, rules may include exit paths. When a value cannot be returned through the normal path of the rule, the exit path of the rule can be executed, thereby exiting the execution of the rule and thus ensuring that no deadlock occurs. For example, the exit path may be automatically triggered when the parent task of the rule is the minimum task among all tasks waiting at the rendezvous. For the determination of the minimum task, reference may be made to the foregoing content, and details are not described herein again.

Thus, in an embodiment, a rule may be composed of a constructor for creation in tasks, any number of ECA clauses, and an otherwise clause.

It should be understood that while the above describes the definition of rules by using ECA grammar, in other embodiments, rules may be defined using other applicable grammars in the art. For example, any language supporting asynchronous programming paradigms with futures and promises might be used. This is not limited in the embodiments of the present invention.

As described above, in a specific embodiment, inspecting current state of the i-th task according to the rule corresponding to the i-th task may comprise: when a normal return value is generated according to the normal path of the rule corresponding to the i-th task, inspecting the current state of the i-th task according to the normal return value so as to steer the continued execution of the i-th task; when a normal return value cannot be generated according to the normal path of the rule corresponding to the i-th task, exiting the running of the rule corresponding to the i-th task according to the exit path of the rule corresponding to the i-th task so as to continue to execute the i-th task according to a set value generated by the exit path. In an embodiment, the i-th task may be the task with the minimal index among tasks waiting at the rendezvous. When a normal return value cannot be generated according to the normal path of the rule corresponding to the i-th task, an exit path may be executed, thereby returning a set value through the exit path, and the set value may indicate that the inspection of the task state is exited and the execution of the task is continued.

The solutions of embodiments of the present disclosure may be implemented on reconfigurable hardware (e.g., a Field-Programmable Gate Array (FPGA)) or on non-reconfigurable hardware (e.g., a processor). That is, with the embodiments of the present disclosure, it is possible to implement parallelization of irregular applications on reconfigurable hardware or non-reconfigurable hardware, so that it is possible to efficiently handle irregular applications.

In order to implement the method for processing an irregular application according to the embodiments of the present disclosure on reconfigurable hardware, executing the M classes of tasks in parallel may comprise: allocating the M classes of tasks respectively as N task queues, wherein N is a positive integer; generating K data paths, wherein K is a positive integer; executing the N task queues in parallel on the K data paths, wherein tasks in each of the N task queues are executed in parallel. For example, tasks in the task queues may be popped into the corresponding data paths in first-in-first-out order. For example, data paths may be implemented through pipelines. As can be appreciated, a task queue may be implemented by one or more data paths. Each task queue may include one or more tasks. This is not limited in the embodiments of the present disclosure.

Allocating the M classes of tasks respectively as N task queues may comprise: dividing the M classes of tasks into N task sets, where tasks in a same task set have a same function; allocating the N task sets respectively as the N task queues, where a task set corresponds to a task queue. The N task sets here may be active task sets, and tasks in the task sets are all ready to execute. It can be seen that with such an embodiment, the parallelization of irregular applications can be efficiently implemented on the reconfigurable hardware.

Reconfigurable hardware can significantly improve processing performance due to its flexibility of programmability and spatial parallelism, therefore, it has become one of the mainstream research directions in recent years. Traditionally, reconfigurable hardware is programmed with Hardware Description Languages (HDL) which are based on a hardware-centered abstraction. Therefore, regarding the implementation of irregular applications on reconfigurable hardware, the efficient mapping of irregular applications to reconfigurable hardware can only be established by manually orchestrating the inherent parallelism of irregular applications and using HDL design. However, such a manual method is very complicated and difficult to implement in various complex systems that are being developed (for example, warehouse-scale and distributed systems).

For existing high-level language programming models for reconfigurable hardware (such as high-level synthesis based on C language or OpenCL), the parallelism in the applications needs to be extracted at compile time, however, the dependencies between tasks in irregular applications can only be completely determined after the input data is given at runtime. Therefore, such high-level language programming models are only suitable for regular applications, and are not suitable for irregular applications.

In this regard, the solution provided by the embodiment of the present disclosure is very suitable for efficiently implementing irregular applications on reconfigurable hardware. With the solution according to the embodiment of the present disclosure, irregular applications can be implemented on the FPGA with high-level synthesis, that is, irregular applications can be correctly and automatically converted into hardware accelerators on the FPGA with high performance. In addition, through the solution according to the embodiment of the present disclosure, it is not necessary for the developer to understand the hardware knowledge, thus the processing complexity of the developer can be reduced.

In order to enable those skilled in the art better understand the embodiments of the present disclosure, how to implement parallelization of irregular applications on an FPGA that is a typical reconfigurable hardware will be further explained through examples. It should be understood that the following examples do not limit the scope of the embodiments of the present disclosure.

These examples will be described below in conjunction with the figures. FIG. 3 is a schematic diagram of a process for implementing an irregular application on an FPGA according to an embodiment of the present disclosure.

As shown in FIG. 3, in block 301, M classes of tasks of the irregular application may be determined, where each task in each class of task is respectively allocated an index, and the index of each task may be used to indicate the order in which the task appears in the irregular application. In addition, a general rule may be predefined, which may be used to indicate dependency relationship between tasks.

In block 302, the irregular application may be converted to a Boolean Data-flow Graph (BDFG) according to the tasks and rule determined in block 301. The process of block 302 may be implemented using a programming language suitable for use in the art. It can be understood that the process may be implemented on a processor coupled with an FPGA or on an FPGA, which is not limited in the embodiment of the present disclosure. The operation of block 302 will also be described below in conjunction with specific examples.

In block 303, data paths may be generated on the FPGA based on the Boolean data-flow graph to execute the irregular application. That is, irregular applications may be mapped as accelerators on the FPGA.

Figure 4:
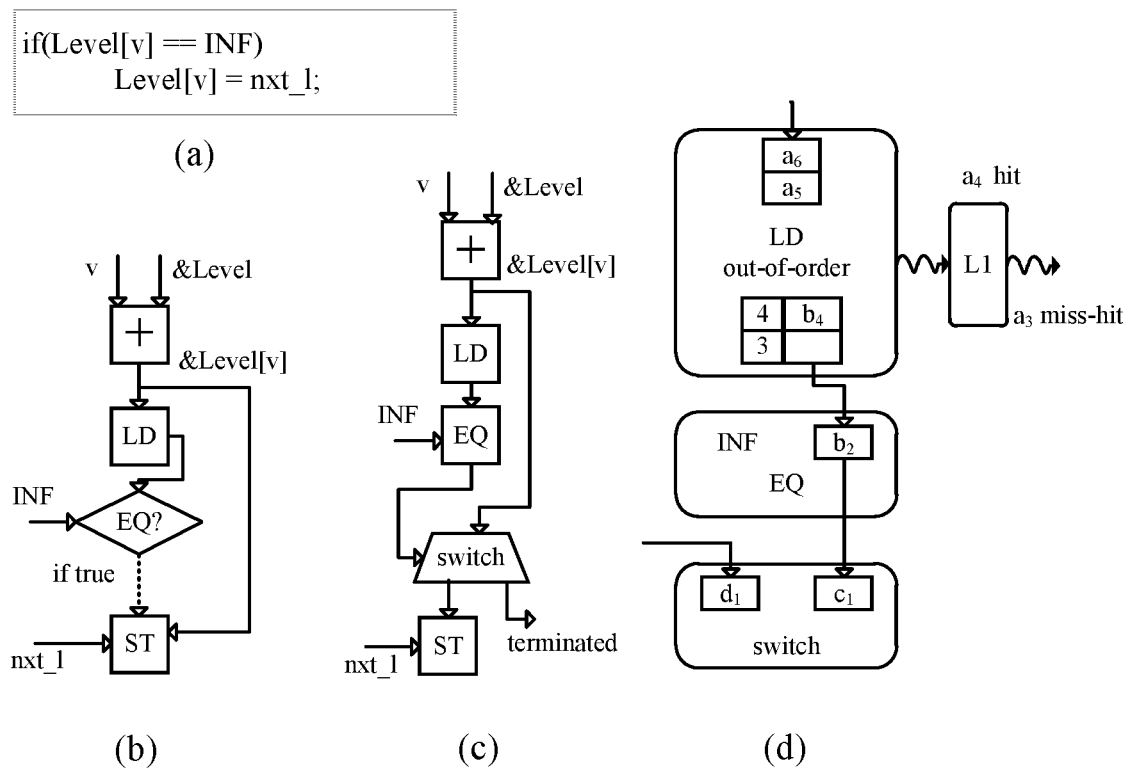
FIG. 4 is a diagram that shows an example process of generating a Boolean data-flow graph suitable for an FPGA implementation according to an embodiment of the present disclosure.

FIG. 4 (a)-(d) shows an example of a process of generating a Boolean data-flow graph suitable for an FPGA implementation. For example, FIG. 4(a) shows an example code segment of an irregular application. FIG. 4(b) shows the Program Dependence Graph (PDG) for this code segment. In FIG. 4(b), the control dependence may be represented as dashed lines. FIG. 4(c) shows a data-flow diagram converted according to FIG. 4(b). The data-flow graph encodes the control dependences of a program into data dependences among actors/nodes (i.e. tasks) to eliminate the need of centralized control units. When implemented on an FPGA, one actor/node in the BDFG may correspond to one computing module of the FPGA, and each connection in the BDFG may correspond to a communication link on the FPGA (composed of interconnects and cache queues). The computing modules may be driven by the data of the higher level communication link to obtain the input data for computing, and then output the computing result to the lower level communication link. Thus, the BDFG may be implemented as data paths on the FPGA, for example, as shown in FIG. 4(d).

In addition, in FIGS. 4(b)-4(d), "LD" may represent "Load", "EQ" may represent "Equal", and "ST" may represent "Write (Store)".

In addition, the general rules may also be converted to BDFG in a systematic way to further implement the rules on the FPGA.

Figure 5:
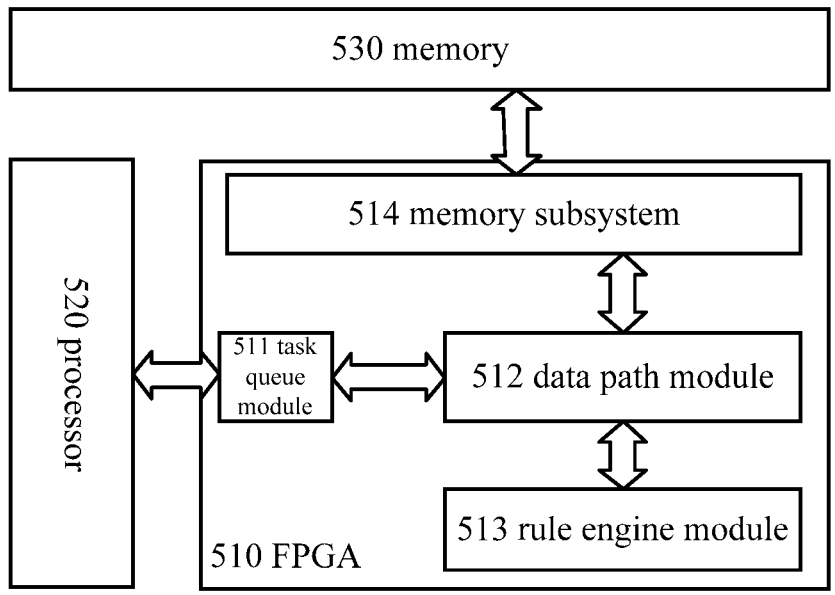
FIG. 5 is a diagram that shows an example system in which embodiments of the present disclosure may be implemented according to an embodiment of the present disclosure.

FIG. 5 shows a schematic block diagram of an example system in which embodiments of the present disclosure may be implemented. As shown in FIG. 5, the system may include an FPGA 510, a processor 520, and a memory 530. The FPGA 510 may be coupled to the processor 520 and the memory 530. For example, the processor 520 may be any suitable processor, such as Intel's Xeon processor. The memory 530 may include any suitable memory, such as a Dynamic Random Access Memory (DRAM).

As shown in FIG. 5, the FPGA 510 may include a task queue module 511, a data path module 512, a rule engine module 513, and a memory subsystem 514.

The task queue module 511 may include at least one task queue. In an embodiment, each task queue may include an active task set. As described above, an active task set may include at least one active task of the irregular application, and the at least one active task may have the same function. It can be understood that when a task is pushed into a task queue, the task may be considered as active.

The data path module 512 may include at least one pipeline. For example, according to the topology of the BDFG, multiple pipelines may be incrementally generated until the resource limit of the FPGA is reached.

However, operations with unpredictable latency may severely degrade the utilization of the pipelines. For example, a direct read hit to the 64 KB on-FPGA cache results in 70 ns (or 14 FPGA cycles) latency, whereas a cache miss-hit could stall the memory operation for about 200 ns.

To solve this problem, a dynamic data-flow approach is adopted in the embodiment of the present disclosure, and the tasks are reordered according to the availability of the operands. As a result, blocked tasks may be bypassed. As showed in FIG. 4 (d), load (i.e. LD) operation node issued new request a4 regardless of the stalled task a3 due to cache miss-hit. In addition, in the embodiment of the present disclosure, out-of-order execution may be limited to the previously described rendezvous, so as to ensure the correctness of the results of parallel execution of these tasks. Optionally, in order to ensure a simple data path implementation, before the out-of-order results in the read operation node are output to the lower-level communication link, these results may be restored to the normal sequence.

In an embodiment, the processor 520 may initialize the task queue. Tasks in the task queue may be popped into the pipelines in the data path module 512 in first-in-first-out order. For example, each task queue may correspond to one pipeline or multiple pipelines.

The rule engine module 513 may implement the above-described general rules. It can be understood that different classes of general rules may need to be pre-defined for different classes of tasks. Therefore, the rule engine module 513 may implement different classes of general rules. When it is necessary to determine the rule corresponding to a certain task, the rule engine module 513 may use the index of the task and related parameters to instantiate the general rule, thereby creating a rule corresponding to the task.

In addition, it can be understood that at least one pipeline in the data path module 512 may share the rule engine module 513 so that the correctness of the execution result may be ensured.

The memory subsystem 514 may be implemented with any available memory known in the art, which may be used to store relevant information (e.g., configuration information of an FPGA, etc.) involved in implementing embodiments of the present disclosure.

The interaction process between the data path module 512 and the rule engine module 513 will be described below with reference to examples. It should be understood that this example is merely for helping those skilled in the art to better understand the embodiments of the present disclosure, rather than limiting the scope of the embodiments of the present disclosure.

Figure 6:
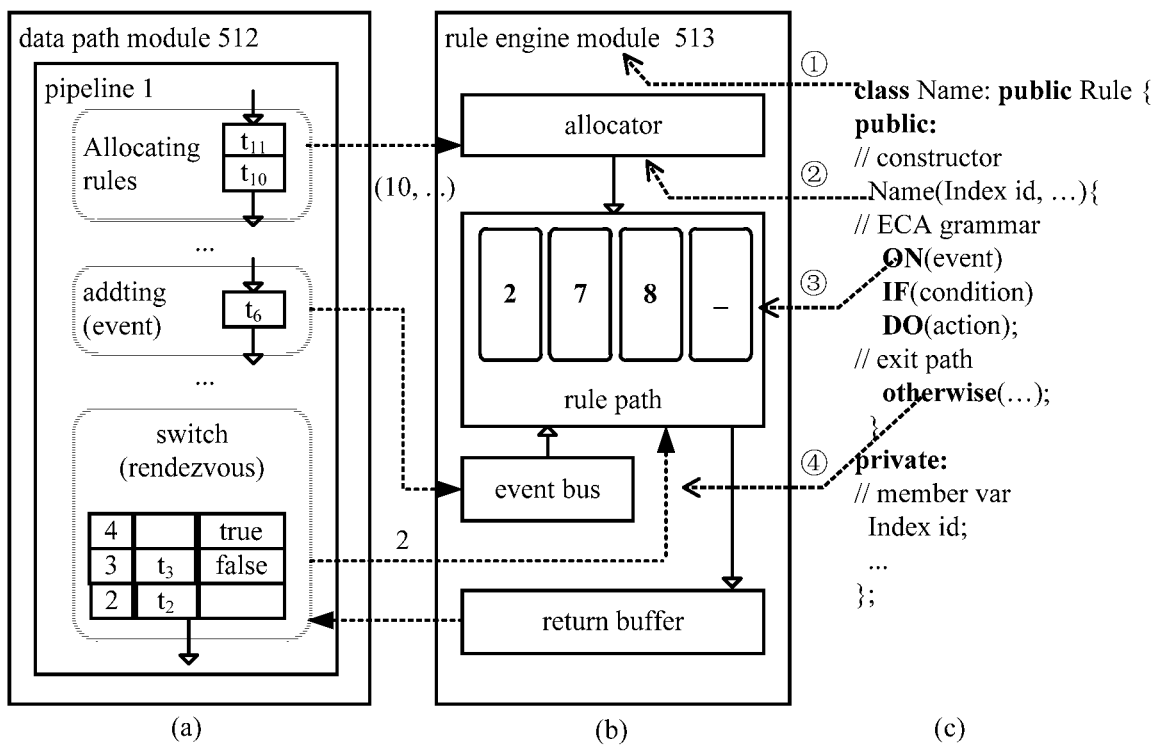
FIG. 6 is a diagram that shows an example interaction process between the data path module and the rule engine module according to one embodiment of the present disclosure.

FIG. 6 (a)-(c) illustrate an interaction process between the data path module 512 and the rule engine module 513 according to one embodiment of the present disclosure. Specifically, FIG. 6 (a) shows an example pipeline 1 in the data path module 512. FIG. 6 (b) shows a schematic structural diagram of the rule engine module 513. FIG. 6 (c) shows a general rule pseudo code segment as an example.

As shown in FIG. 6(a), rules may be allocated in pipeline 1. For example, a rule corresponding to a task may be constructed with the index of the task and other variables as input parameters (FIG. 6 (c) ②). The allocator in the rule engine module 513 may allocate a rule lane for the index of the task (FIG. 6(c) ③). If no lane is available, the parental task will be stalled.

In addition, events may be captured by broadcasting tasks reaching a specific operation by an event bus in the rule engine module 513. If a rule corresponding to a task gets a return value by executing a normal path (for example, the path defined by the ECA grammar in FIG. 6(c)), it may put the return value in the return buffer in the rule engine module 513 and release the corresponding rule lane. Rendezvous is planned in pipeline 1 as a switch, which reorders the out-of-order return values and steers the continued execution of the task based on these values.

Moreover, the minimum task index at the rendezvous across all pipelines may be broadcast to rule lanes, so as to trigger the exit path (e.g., otherwise clause (FIG. 6 (c) ④)) in the rule when the normal path cannot be executed. It can be understood that the rule engine module here may be equivalent to the runtime scheduler in the implementation of aggressive parallelization.

It can be seen that, through the above embodiment, fine-grained pipeline parallelism of irregular applications can be implemented on the FPGA, thereby, irregular applications can be correctly and automatically converted into hardware accelerators on the FPGA with high performance.

In addition, in order to further illustrate the beneficial effects of the embodiments of the present disclosure, the implementation results of the embodiments of the present disclosure and the existing solutions on the Intel-Altera Heterogeneous Architecture Research Platform (HARP) are compared below. The HARP may include a processor and an Altera Stratix V 5SGXEA7N1FC45FPGA.

In this example, the tested irregular application is a breadth-first search (BFS) algorithm. The existing, disclosed solution used in the tests is as follows: based on OpenCL language, manually analyze the parallelism of the BFS, and write the corresponding code, and then use Altera OpenCL tool to generate the program implemented on the FPGA.

Correspondingly, the benchmark programs used are as follows: Speculative parallelized BFS (SPEC-BFS) and Coordinated Parallelized BFS (COOR-BFS) adopting the embodiments of the present disclosure, and OpenCL version of BFS (OpenCL-BFS) adopting the existing solution.

Table 1 shows the execution time of the SPEC-BFS and COOR-BFS adopting the embodiment of the present disclosure on the FPGA, and the execution time of the OpenCL-BFS adopting the existing solution on the FPGA.

TABLE 1

| Adopted solution | OpenCL-BFS | SPEC-BFS | COOR-BFS |
|---|---|---|---|
| Execution time (seconds) | 124.1 | 0.47 | 0.64 |

As can be seen from table 1, the processing result of the irregular application adopting the embodiment of the present disclosure is obviously better than that of the existing solution. It can be seen that compared with the existing processing solutions, the solutions of the embodiments of the present disclosure can efficiently execute irregular applications, and the implementation complexity is greatly reduced.

Figure 7:
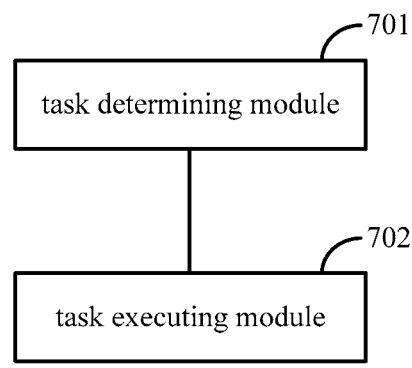
FIG. 7 is a schematic block diagram of a device for processing an irregular application according to an embodiment of the present disclosure.

FIG. 7 is a schematic block diagram of a device for processing an irregular application according to an embodiment of the present disclosure. The device may include a processor, and the processor may be configured to execute the following program modules (as shown in FIG. 7) stored in a memory:

a task determining module 701 configured to determine M classes of tasks of the irregular application, wherein M is a positive integer;

a task executing module 702 configured to execute the M classes of tasks in parallel, wherein each task in each class of tasks in the M classes of tasks has an index respectively, and the index of each task is used to indicate the order in which the task appears in the irregular application;

the task executing module 702 is further configured to: for an i-th task in the x-th class task of the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting current state of the i-th task according to the rule corresponding to the i-th task so as to steer the continued execution of the i-th task.

In an embodiment, the task determining module 701 may be specifically configured to identify M loops in the irregular application as the M classes of tasks.

In an embodiment, the index has the form of an M-tuple, wherein, in the M-tuple used to indicate the i-th task in the x-th class task, the x-th element is used to indicate the iteration count of the i-th task in the x-th class task, the (x−1) elements before the x-th element are used to indicate the (x−1) classes of tasks executed before the x-th class task in the M classes of tasks respectively, and the order of the (x−1) elements corresponds to the order in which the (x−1) classes of tasks appear in the irregular application.

In an embodiment, the task executing module 702 may be specifically configured to determine the rule corresponding to the i-th task according to the index of the i-th task in the following manner:

instantiating a pre-defined general rule based on at least the index of the i-th task to create the rule corresponding to the i-th task, where the general rule is used to indicate the dependency relationship between the tasks of the irregular application.

In an embodiment, the general rule includes a normal path and an exit path, and the normal path is defined using an Event-Condition-Action grammar.

In an embodiment, the task executing module 702 may be specifically configured to inspect current state of the i-th task according to the rule corresponding to the i-th task so as to steer the continued execution of the i-th task in the following manner:

when a normal return value is generated according to the normal path of the rule corresponding to the i-th task, inspecting the current state of the i-th task according to the normal return value so as to steer the continued execution of the i-th task;

when a normal return value cannot be generated according to the normal path of the rule corresponding to the i-th task, exiting the running of the rule corresponding to the i-th task according to the exit path of the rule corresponding to the i-th task so as to continue to execute the i-th task according to a set value generated by the exit path.

In an embodiment, the i-th task is the task with the minimal index among tasks waiting at the rendezvous.

In an embodiment, the task executing module 702 may be specifically configured to execute the M classes of tasks in parallel in the following manner:

allocating the M classes of tasks respectively as N task queues, wherein N is a positive integer;

generating K data paths, wherein K is a positive integer;

executing the N task queues in parallel on the K data paths, wherein tasks in each of the N task queues are executed in parallel.

In an embodiment, the task executing module 702 may be specifically configured to allocate the M classes of tasks respectively as N task queues in the following manner:

dividing the M classes of tasks into N task sets, where tasks in a same task set have a same function;

allocating the N task sets respectively as the N task queues, where a task set corresponds to a task queue.

Figure 8:
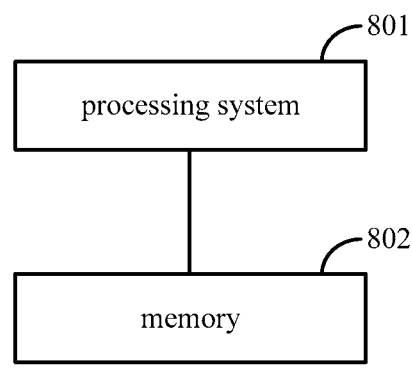
FIG. 8 is a schematic block diagram of a device for processing an irregular application according to another embodiment of the present disclosure.

FIG. 8 is a schematic block diagram of a device for processing an irregular application according to another embodiment of the present disclosure. As shown in FIG. 8, the device may comprise a processing system 801, a memory 802 and a computer program stored on the memory 802 and operable on the processing system 801, the processing system 801 being coupled with the memory 802, wherein, the method for processing an irregular application described above is implemented when the processing system 801 executes the computer program.

In an embodiment, the device for processing an irregular application shown in FIG. 8 may be any device capable of realizing its functions. For example, the device may be a desktop computer, a laptop computer, a mobile device, etc., which is not limited by the present disclosure. The processing system 801 may include a processor, a reconfigurable hardware, or a combination of both, wherein the processor may be implemented using, for example, a general-purpose processor, a controller, etc., such as an Intel Xeon processor, etc.; the reconfigurable hardware may include, for example, field programmable gate arrays, etc. These are not limited in the present disclosure, and related variations should all fall within the protection scope of the present disclosure. The memory 802 may include any suitable memory, such as a dynamic random access memory, etc. The present disclosure is not limited thereto, and related variations should also fall into the protection scope of the present disclosure.

In the embodiment of the present disclosure, a computer-readable storage medium is also provided. The computer-readable storage medium stores a computer program capable of executing the above method for processing an irregular application.

To sum up, in the embodiment of the present disclosure, by dividing M classes of tasks of the irregular application and causing the M-class tasks to be executed in parallel, the execution performance and efficiency of the irregular application can be improved; and when a task is executed to a rendezvous, the current state of the task is inspected according to its dependencies on other tasks, and the continued execution of the task is steered on the basis of the current state, thereby ensuring the correctness of the task parallel execution result. Therefore, according to the embodiment of the present disclosure, irregular applications can be correctly and automatically executed with high performance in a manner of fine-grained pipeline parallelism.

Those skilled in the art should understand that the embodiments of the present disclosure may be provided as a method, a system, or a computer program product. Thus, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including but not limited to disk memory, CD-ROM, optical memory, etc.) having computer-usable program code embodied therein.

The present disclosure is described with reference to flowcharts and/or block diagrams of the method, the device (system), and the computer program product according to the embodiment of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine, such that instructions executed by a processor of a computer or other programmable data processing device generate an device for implementing the functions specified in one or more flows of a flowchart and/or one or more blocks of a block diagram.

The computer program instructions may also be stored in a computer-readable memory capable of directing a computer or other programmable data processing device to operate in a specific manner, so that instructions stored in the computer-readable memory produce an article of manufacture comprising an instruction device. The instruction device implements the functions specified in one or more flows of a flowchart and/or one or more blocks of a block diagram.

The computer program instructions may also be loaded onto a computer or other programmable data processing device such that a series of operational steps are performed on the computer or other programmable device to generate computer-implemented processes, thus, the instructions executed on the computer or other programmable device provide steps for implementing the functions specified in one or more flows of a flowchart and/or one or more blocks of a block diagram.

The specific embodiments described above further illustrate the purpose, technical solutions and beneficial effects of the present disclosure. It should be understood that the above description is only specific embodiments of the present disclosure and is not used to limit the present disclosure. Any modification, equivalent replacement, and improvement made within the spirit and principle of the present disclosure shall fall within the protection scope of the present disclosure.

What is claimed is:

1. A method for processing an irregular application, comprising:
    determining M classes of tasks of the irregular application, wherein each task in each class of tasks in the M classes of tasks has an index respectively, and the index of each task is used to indicate the order in which the task appears in the irregular application, and M is a positive integer;
    dividing the M classes of tasks into N task sets, and allocating the N task sets respectively as N task queues, wherein tasks in a same task set have a same function, and a task set corresponds to a task queue, and N is a positive integer;
    generating N data paths, executing the N task queues in parallel on the N data paths, wherein each data path executes one or more tasks in a task queue in parallel such that tasks in each of the N task queues are executed in parallel;
    for an i-th task in the x-th class task of the M classes of tasks, i is a positive integer and x is a positive integer less than or equal to M:
    when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting a current state of the i-th task according to the rule corresponding to the i-th task to steer the continued execution of the i-th task.

2. The method according to claim 1, wherein determining M classes of tasks of the irregular application comprises identifying M loops in the irregular application as the M classes of tasks.

3. The method according to claim 2, wherein, the index has a form of an M-tuple, wherein, in the M-tuple used to indicate the i-th task in the x-th class task, the x-th element is used to indicate the iteration count of the i-th task in the x-th class task, the (x−1) elements before the x-th element are used to indicate the (x−1) classes of tasks executed before the x-th class task in the M classes of tasks respectively, and the order of the (x−1) elements corresponds to the order in which the (x−1) classes of tasks appear in the irregular application.

4. The method according to claim 1, wherein determining the rule corresponding to the i-th task according to the index of the i-th task comprises: instantiating a pre-defined general rule based on at least the index of the i-th task to create the rule corresponding to the i-th task, wherein the general rule is used to indicate the dependency relationship between the tasks of the irregular application.

5. The method according to claim 4, wherein
    the general rule includes a normal path and an exit path, and the normal path is defined by using an Event-Condition-Action grammar.

6. The method according to claim 5, wherein inspecting a current state of the i-th task according to the rule corresponding to the i-th task so as to steer the continued execution of the i-th task comprises: when a normal return value is generated according to the normal path of the rule corresponding to the i-th task, inspecting the current state of the i-th task according to the normal return value so as to steer the continued execution of the i-th task;
    when a normal return value cannot be generated according to the normal path of the rule corresponding to the i-th task, exiting the running of the rule corresponding to the i-th task according to the exit path of the rule corresponding to the i-th task so as to continue to execute the i-th task according to a set value generated by the exit path.

7. The method according to claim 6, wherein the i-th task is the task with the minimal index among tasks waiting at the rendezvous.

8. A non-transitory computer-readable storage medium storing a computer program capable of executing the method according to claim 1.

9. A device for processing an irregular application, comprising a processor, wherein the processor is configured to execute following program modules stored in a memory:
    a task determining module configured to determine M classes of tasks of the irregular application, wherein each task in each class of tasks in the M classes of tasks has an index respectively, and the index of each task is used to indicate the order in which the task appears in the irregular application, and M is a positive integer;
    a task executing module configured to: divide the M classes of tasks into N task sets, and allocate the N task sets respectively as N task queues, wherein tasks in a same task set have a same function, and a task set corresponds to a task queue, and N is a positive integer;
    generate N data paths, and execute the N task queues in parallel on the N data paths, wherein each data path executes one or more tasks in a task queue in parallel such that tasks in each of the N task queues are executed in parallel;
    the task executing module is further configured to: for an i-th task in the x-th class task of the M classes of tasks, wherein i is a positive integer and x is a positive integer less than or equal to M: when the i-th task is executed to a rendezvous, stalling the i-th task, and determining a rule corresponding to the i-th task according to the index of the i-th task, the rule corresponding to the i-th task is used to indicate dependency relationship between the i-th task and other tasks in the M classes of tasks; inspecting current state of the i-th task according to the rule corresponding to the i-th task to steer the continued execution of the i-th task.

10. The device according to claim 9, wherein the task determining module is specifically configured to identify M loops in the irregular application as the M classes of tasks.

11. The device according to claim 10, wherein, the index has the form of an M-tuple, wherein, in the M-tuple used to indicate the i-th task in the x-th class task, the x-th element is used to indicate the iteration count of the i-th task in the x-th class task, the (x−1) elements before the x-th element are used to indicate the (x−1) classes of tasks executed before the x-th class task in the M classes of tasks respectively, and the order of the (x−1) elements corresponds to the order in which the (x−1) classes of tasks appear in the irregular application.

12. The device according to claim 9, wherein the task executing module is specifically configured to determine the rule corresponding to the i-th task according to the index of the i-th task in the following manner:
   instantiating a pre-defined general rule based on at least the index of the i-th task to create the rule corresponding to the i-th task, where the general rule is used to indicate the dependency relationship between the tasks of the irregular application.

13. The device according to claim 12, wherein,
   the general rule includes a normal path and an exit path, and the normal path is defined using an Event-Condition-Action grammar.

14. The device according to claim 13, wherein the task executing module is specifically configured to inspect current state of the i-th task according to the rule corresponding to the i-th task so as to steer the continued execution of the i-th task in the following manner:
   when a normal return value is generated according to the normal path of the rule corresponding to the i-th task, inspecting the current state of the i-th task according to the normal return value to steer the continued execution of the i-th task;
   when a normal return value cannot be generated according to the normal path of the rule corresponding to the i-th task, exiting the running of the rule corresponding to the i-th task according to the exit path of the rule corresponding to the i-th task so as to continue to execute the i-th task according to a set value generated by the exit path.

15. The device according to claim 14, wherein, the i-th task is the task with the minimal index among tasks waiting at the rendezvous.

* * * * *